United States Patent
Chen et al.

(10) Patent No.: US 9,136,921 B2
(45) Date of Patent: Sep. 15, 2015

(54) METHOD FOR CHANNEL INFORMATION FEEDBACK AND A TERMINAL

(75) Inventors: Yijian Chen, Shenzhen (CN); Yungok Li, Shenzhen (CN); Jun Xu, Shenzhen (CN); Junfeng Zhang, Shenzhen (CN); Shupeng Li, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 204 days.

(21) Appl. No.: 13/877,127

(22) PCT Filed: Jun. 30, 2011

(86) PCT No.: PCT/CN2011/076740
§ 371 (c)(1),
(2), (4) Date: Mar. 29, 2013

(87) PCT Pub. No.: WO2012/041103
PCT Pub. Date: Apr. 5, 2012

(65) Prior Publication Data
US 2013/0188593 A1 Jul. 25, 2013

(30) Foreign Application Priority Data
Sep. 30, 2010 (CN) .............................. 201010507716

(51) Int. Cl.
*H04B 7/04* (2006.01)
*H04B 7/06* (2006.01)
*H04L 1/00* (2006.01)

(52) U.S. Cl.
CPC ............. *H04B 7/0417* (2013.01); *H04B 7/063* (2013.01); *H04B 7/0639* (2013.01); *H04L 1/003* (2013.01); *H04L 1/0026* (2013.01); *H04L 1/0029* (2013.01); *H04L 1/0031* (2013.01)

(58) Field of Classification Search
None
See application file for complete search history.

(56) References Cited

U.S. PATENT DOCUMENTS

| 8,811,520 B2* | 8/2014 | Kim et al. ............. 375/267 |
| 2007/0149128 A1* | 6/2007 | Das et al. ............. 455/67.11 |

(Continued)

FOREIGN PATENT DOCUMENTS

| CN | 101507139 A | 8/2009 |
| CN | 101779403 A | 7/2010 |

(Continued)

OTHER PUBLICATIONS

International Search Report (Form PCT/ISA/210) for PCT/CN2011/076740, mailed Sep. 8, 2011.

(Continued)

*Primary Examiner* — Brian D Nguyen
*Assistant Examiner* — Roberta A Shand
(74) *Attorney, Agent, or Firm* — Koppel, Patrick, Heybl & Philpott (57) ABSTRACT

The disclosure provides a method for channel information feedback and a terminal, applied in an 8 antennae system, comprising: a terminal acquires the channel information which comprises PMI1 information and RI information; the terminal jointly encodes the PMI1 information and RI information into a 5 bit Report Type; the terminal feeds back the Report Type on a physical uplink control channel. The disclosure solves the poor transmission performance of the system caused by high overhead of channel information feedback in the related arts, thus improving the performance of the terminal to feed back information and improving the transmission performance of the system.

20 Claims, 2 Drawing Sheets

(56) References Cited

U.S. PATENT DOCUMENTS

| | | | |
|---|---|---|---|
| 2009/0201825 A1* | 8/2009 | Shen et al. | 370/252 |
| 2010/0273435 A1* | 10/2010 | Sun et al. | 455/67.13 |
| 2011/0116448 A1* | 5/2011 | Jongren | 370/328 |
| 2012/0003945 A1* | 1/2012 | Liu et al. | 455/115.1 |

FOREIGN PATENT DOCUMENTS

| | | |
|---|---|---|
| CN | 101834708 A | 9/2010 |
| CN | 101969367 A | 2/2011 |

OTHER PUBLICATIONS

Extended European Search from corresponding European Patent Appl. No. 11827999.1—1851, dated Aug. 13, 2014.

Nokia, et al; "PUCCH signaling for double codebook", 3GPP Draft; RI-104447, $3^{rd}$ Generation Partnership Project (3GPP). Mobile Competence Centre; 650, Route Des Lucioles: F-06921 Sophia- Antipolis CEDEX; France, vol. RAN WG1, no. Madrid, Spain; 20100823, Aug. 17, 2010, XP050449776, [retrieved on Aug. 17, 2010] *Section 2; p. 1—p. 2; table 1.

Huawei: "Concrete proposal for 8TX codebook and related feedback", 3GPP Draft; RI-104294 Double codebook for 8TX Fina, $3^{rd}$ Generation partnership project (3GPP), Mobile Competence Centre; 650, Route Des Lucioles; F-06921 Sophia-Antipolis Cedes; France, vol. RAN WG1, no. Madrid. Spain: 20100823, Aug. 27, 2010, XP050450262, [retrived on Aug. 27, 2010] *Section 3; p. 2* Section 5; p. 5.

Texas Instruments: "Progressing on CSI Feedback for Re1.10 Downlink MIMO". 3GPP Draft; RI-104475 TI Rio Feedback, $3^{rd}$ Generation Partnership Project (3GPP. Mobile Competence Centre; 650, Route Des Lucioles; F-06921 Sophia-Antipolis Codes: France; vol. RAN WG1. no. Madrid. Spain; 20100823, Aug. 17, 2010, XP050449798 [retrieved on Aug. 17, 2010] •p. 3, line 8—line 11.

ZTE: "Considering on Signaling for Two-component Feedback". 3GPP Draft, R1-104558. $3^{rd}$ Generation Partnership Project (3GPP), Mobile Competece Centre: 650. Route Des Lucioles; F-06921 Sophia-Antipolis Cedex: France. vol. RAN WG1, no. Madrid, Spain; 20100823, Aug. 17, 2010. [retrieved on Aug. 17, 2010].

Office Action from corresponding Chinese Patent Appl. No. 201010507716.2, dated Jun. 19, 2014.

* cited by examiner

METHOD FOR CHANNEL INFORMATION FEEDBACK AND A TERMINAL

TECHNICAL FIELD

The disclosure relates to the communication field, and specifically to a method for channel information feedback and a terminal.

BACKGROUND

In a wireless communication system, a sending terminal and a receiving terminal use multiple antennae to acquire a higher speed in a manner of spatial multiplexing. Compared to general spatial multiplexing manner, an enhanced technology is one that the receiving terminal feeds channel information back to the sending terminal which uses some transmission precoding technologies according to the channel information acquired, thus improving the transmission performance significantly. For single-user Multi-Input Multi-Output (MIMO), precoding is performed by directly using channel characteristic vector information; while for multiple-user MIMO, more precise channel information is required.

The channel information is fed back mainly through a simple single codebook feedback method in the Long Term Evolution (LTE), while the performance of the MIMO transmission precoding technology depends more on the feedback accuracy of the codebook.

The basic principle of the channel information quantized feedback of the codebook is as follows.

Assuming that a limited feedback channel capacity is B bps/Hz, then the number of available code words is. $N=2^B$. The characteristic vector space of a channel matrix constructs a codebook space $\Re = \{F_1, F_2 \ldots F_N\}$ through quantization. The sending and receiving terminals store the codebook together or generate the codebook in real time (the sending and receiving terminals use the same codebook). On the basis of a channel matrix H acquired by the receiving terminal, the receiving terminal selects, from $\Re$, a code word $\hat{F}$ most matching with the channel according to certain rules and feeds the serial number i of the code word back to the sending terminal. The serial number of the code word is called Precoding Matrix Indicator (PMI) herein. The sending terminal finds the corresponding precoding code word $\hat{F}$ according to the serial number i of the code word, thus acquiring the corresponding channel information, wherein $\hat{F}$ represents the characteristic vector information of the channel.

Generally, the codebook space $\Re$ can be further divided into the codebook corresponding to multiple Ranks, wherein each Rank corresponds to multiple code words for quantizing the precoding matrix composed of the channel characteristic vectors under the Rank. Ordinary codebook feedback technologies adopt one PMI to feed back the information of one code word matrix. Since the Rank of the channel is equal to the number of non-zero characteristic vectors, there will be N columns of code words when the Rank is N. Therefore, the codebook space $\Re$ can be divided into multiple sub-codebooks according to the Rank, as shown in Table 1.

TABLE 1

Schematic table of codebook space

| $\Re$ number of layers $\upsilon$ | | | |
|---|---|---|---|
| 1 | 2 | ... | N |
| $\Re_1$ | $\Re_2$ | ... | $\Re_N$ |
| set of code word vectors with 1 column | set of code word vectors with 2 columns | ... | set of code word vectors with N columns |

Wherein, when the Rank>1, all the code words required to be stored are in the form of matrix. The codebook in the LTE protocol uses this codebook quantization feedback method. The codebook for downlink 4 transmitting antennae in the LTE is as shown in Table 2. In fact, the precoding codebook in the LTE has the same meaning with the channel information quantization codebook. For uniformity's sake, the vector can be regarded as a matrix with a dimension of 1.

In the LTE, the feedback channel state information comprises: a channel quality indication (CQI), a precoding matrix indicator (PMI) and a rank indicator (RI). CQI is an indication for evaluating the quality of the downlink channel. In the 3GPP 36-213 protocol, CQI is expressed by the integral values within 0~15, representing different CQI levels respectively, wherein different CQIs correspond to their own Modulation Codes and coding rates (Modulate Code format Set, MCS).

RI is used to describe the number of the space independent channels, and corresponds to the Rank of a channel response matrix. In open-loop and closed-loop spatial multiplexing modes, the RI information is required to be fed back by the UE, while in other modes, the RI information is not required to be fed back. The Rank of the channel matrix corresponds to the number of layers.

The feedback method for uplink channel information in the LTE can be divided into two kinds: periodic channel information feedback on a Physical Uplink Control Channel (PUCCH); and non-periodic channel information feedback on a Physical Uplink Share Channel (PUSCH). The PUCCH is a control channel with high feedback reliability, but the feedback resources thereof are valuable, so the feedback overhead is greatly restricted. Generally, the feedback quantity of channel state information (CSI) (comprising one or more of PMI, CQI and RI) for one time should not exceed 11 bits. Although the PUSCH can provide more CSI feedback resources, the reliability cannot be guaranteed, and the feedback will also occupy data transmission resources, so it will have some effects on the transmission of data services.

The periodic channel information feedback method on the PUCCH in the LTE has four feedback types: Type 1: feeding back the subband CQI of the subband selected by a UE; Type 2: feeding back the CQI and PMI information of the broadband; Type 3: feeding back the RI information; Type 4: only feeding back the CQI of the broadband.

The mode supporting open-loop spatial multiplexing is involved with the first three types. One of the feedback method of Type 2 and 3 in the LTE is as shown in Table 2.

TABLE 2

Schematic table of the feedback method of Type 2 and 3 in the LTE

| 1 | 2 | 3 | 4 | 5 | 6 | 7 | 8 | 9 | 10 | 11 | 12 | 13 |
|---|---|---|---|---|---|---|---|---|---|---|---|---|
| Report Type3 | | Report Type2 | | | | | Report Type2 | | | Report Type3 | | Report Type2 |

Wherein, the RI information of Report Type 3 is encoded independently, for example, under 4 antennae (4 Tx), four states under 2 bits are used to represent RI as 1, 2, 3 or 4 respectively. Report Type 2 has the most overhead, comprising not only the PMI information (4 bits) which indicates a certain code word in the LTE codebook but also the CQI information. When RI=1, there is one CQI; and when RI>1, there are 2 CQIs. When there is one CQI, it occupies 4 bits; when two CQIs are fed back, the second CQI adopts difference technique, according to the difference based on the first CQI, the second CQI occupies 3 bits. Therefore, the maximum overhead is 11 bit which also is the maximum supported overhead of the CSI information when feeding back on the PUCCH.

The Long Term Evolution Advanced (LTE-A) system, as the evolved standard of the LTE, can support broader system bandwidth and is downward-compatible with the current standards of the LTE. To enhance the average spectrum efficiency of the cell and increase the cell-edge coverage and throughput, the LTE-A can support 8 antennae maximum in the downlink on the basis of the existing LTE system, and the LTE-A also puts forward several feedback enhancement technologies for codebook feedback, mainly to enhance the feedback precision and to make use of temporal and/or frequency domain correlation of the channel information to cut the overhead. This technology is able to improve the frequency spectrum utilization efficiency and alleviate the shortage of the frequency spectrum resources.

The main thought of the feedback technology for codebook enhancement is: to increase the overhead of PMI feedback comparing with the feedback in the LTE, and to use the feedback of two PMIs to indicate the channel state information together. The enhanced codebook mainly comprises two kinds of implementation ways: to define double codebooks and double PMI feedback, or to define double PMI feedback and single codebook that is equivalent to double codebooks.

The definition of double codebooks and double PMI feedback can be further described as:

1) The structure of precoding/feedback consists of two matrices.

2) Each of the two matrices belongs to an independent codebook. The codebook is simultaneously known by a base station and a UE in advance. The feedback code word can change in different time and different subbands.

3) One matrix indicates the attribute of the broadband or long time channel. The other matrix indicates the attribute of specified frequency band or short time channel.

4) The matrix codebook used is presented in the form of a set of a finite number of matrices, and for the UE and the base station, each matrix is knowable.

5) One of the matrices can be a fixed matrix and do not be required to be fed back. Herein it is equal to single codebook feedback (could be used under the circumstances of high and low rank non-correlated channels).

It can be concluded from the above description that the feedback of channel information puts forward a double codebook-based structure as follows.

For one subband or multiple joint subbands needing channel information feedback, the UE feeds two pieces of PMI information back to the base station (under some circumstances, it can be realized not through feedback, while pre-definition of one PMI as a fixed value can be used instead of feedback). The two pieces of PMI information are PMI1 and PMI2 respectively, wherein PMI1 corresponds to a code word W1 in a codebook C1 and PMI2 corresponds to a code word W2 in the other codebook C2. The base station has the same C1 and C2 information. After receiving the PMI1 and PMI2, the base station can find the corresponding code words W1 and W2 from the corresponding codebooks C1 and C2 and calculate W=F (W1, W2) according to the agreed function rule F so as to acquire the channel information W.

The design criteria of double codebooks above is a specific codebook form in the LTE-A. During specific implementation, only the corresponding codebooks of W1 and W2 are required to be defined, and the PMI1 and PMI2 are fed back in usage.

Except for the double codebook implementation way above, there is also a single codebook feedback method that is equal to double codebooks and double PMI feedback: define a single codebook equivalent to double codebooks and double PMI feedback.

For Rank=r (r is an integer less than or equal to 4), what is different from the above 4Tx codebook is that when this single codebook equivalent to double codebooks is used for feedback, feeding back the code word in the corresponding codebook requires 2 PMIs to indicate its information. The single codebook equivalent to double codebooks generally could be expressed as the table below.

TABLE 3

Schematic table of a single codebook equivalent to double codebooks

| | | $i_2$ | | | |
|---|---|---|---|---|---|
| | | 0 | 1 | ... | N2 |
| $i_1$ | 0 | $W_{i_1, i_2}$ | $W_{i_1, i_2}$ | $W_{i_1, i_2}$ | $W_{i_1, i_2}$ |
| | 1 | $W_{i_1, i_2}$ | $W_{i_1, i_2}$ | $W_{i_1, i_2}$ | $W_{i_1, i_2}$ |
| | ... | $W_{i_1, i_2}$ | $W_{i_1, i_2}$ | $W_{i_1, i_2}$ | $W_{i_1, i_2}$ |
| | N1 | $W_{i_1, i_2}$ | $W_{i_1, i_2}$ | $W_{i_1, i_2}$ | $W_{i_1, i_2}$ |

Herein, $W_{i_1, i_2}$ is a code word indicated by $i_1$ and $i_2$ together, normally can be expressed as the function form of $W(i_1, i_2)$. After the function model W is determined, only $i_1$ and $i_2$ are required to be determined.

In the prior art, the feedback in the LTE-A is conducted through the two methods below.

Method 1: use the configured size of code words as shown in Table 4.

TABLE 4

Schematic table of RI value and the corresponding codebook size

| RI value | Codebook size |
|---|---|
| RI = 1 | $i_1$: 16 indexes<br>$i_2$: 16 indexes<br>Index |
| RI = 2 | $i_1$: 16 indexes<br>$i_2$: 16 indexes |
| RI = 3 | $i_1$: 4 indexes<br>$i_2$: 16 indexes |
| RI = 4 | $i_1$: 4 indexes<br>$i_2$: 8 indexes |
| RI = 5 | i (represented as $i_1$ or $i_2$) 4 indexes, the other one is a fixed index |
| RI = 6 | i (represented as $i_1$ or $i_2$) 4 indexes, the other one is a fixed index |
| RI = 7 | i (represented as $i_1$ or $i_2$) 4 indexes, the other one is a fixed index |
| RI = 8 | Fixed index |

It can be seen that the transmission of the channel information fed back based on this codebook on the PUCCH is relatively difficult. If the PMI information in the original Report Type 2 is substituted with the information of PMI1 $i_1$ and PMI2 $i_2$, apparently the overhead, up to 15 bits, will exceed the overhead limit of 11 bits in many cases. When the overhead exceeds 11 bits, it is required to perform new complex design on the PUCCH, so the compatibility is not good.

Method 2: use joint encoding method, conduct joint encoding to the RI and the PMI. The encoding can be performed according to the method in Table 5; the number of bits acquired in this joint encoding is greater than 6.

TABLE 5

Schematic table of joint encoding

RI and part of the $i_1$ information amounts to 6 bits

RI = 1: 16 states of $i_1$
RI = 2: 16 states of $i_1$
RI = 3: 4 states of $i_1$
RI = 4: 4 states of $i_1$
RI = 5: 4 states of $i_1$
RI = 6: 4 states of $i_1$
RI = 7: 4 states of $i_1$
RI = 8: 1 state of $i_1$
The remaining status bits It could be seen through simulation that during PUCCH feedback, the block error rate (BLER) of certain Report Type transmission affects the performance significantly due to that the encoding technology is required to be changed when the overhead of Report Type reaches 6 bits in LTE/LTE-A system.

For the methods for channel information feedback in the related arts, the high overhead of the channel information leads in poor system transmission performance.

SUMMARY

The disclosure provides a method for channel information feedback and a terminal, so as to solve the problem of the poor system transmission performance caused by the high overhead of the channel information in the channel information feedback methods in the related arts.

One aspect of the disclosure provides a method for channel information feedback, applied to an 8 antennae system, comprising: a terminal acquiring channel information, wherein the channel information comprises: first type precoding matrix indicator (PMI1) information and RI information; the terminal jointly encoding the PMI1 information and the RI information into a 5-bit Report Type; and the terminal feeding back the Report Type on a physical uplink control channel.

The Report Type is used to indicate one item in an information set formed by combination of the RI information and the PMI1 information, wherein the information set comprises: Mr pieces of code word index information when RI=r, wherein r=1, 2 . . . 8, and $$\sum_{r=1}^{8} Mr <= 32,$$

wherein the Mr pieces of code word index information is information of all or part of indexes in a PMI1 information set in a long term evolution (LTE) codebook corresponding to RI=r.

When RI=r, wherein r=1, 2 . . . 8, the value of Mr is:
M1=8, M2=8, M3=4, M4=4, M5=2, M6=2, M7=1, M8=1; or,
M1=8, M2=8, M3=2, M4=2, M5=4, M6=4, M7=2, M8=1; or,
M1=8, M2=8, M3=4, M4=2, M5=4, M6=4, M7=1, M8=1; or,
M1=8, M2=8, M3=2, M4=4, M5=4, M6=4, M7=1, M8=1; or,
M1=8, M2=8, M3=2, M4=4, M5=4, M6=2, M7=2, M8=1; or,
M1=8, M2=8, M3=4, M4=4, M5=1, M6=1, M7=1, M8=1; or,
M1=8, M2=16, M3=2, M4=2, M5=1, M6=1, M7=1, M8=1; or,
M1=16, M2=8, M3=2, M4=2, M5=1, M6=1, M7=1, M8=1; or,
M1=12, M2=12, M3=2, M4=2, M5=1, M6=1, M7=1, M8=1; or,
M1=8, M2=8, M3=4, M4=4, M5=2, M6=2, M7=0, M8=0; or,
M1=8, M2=8, M3=2, M4=2, M5=4, M6=4, M7=2, M8=0; or,
M1=8, M2=8, M3=4, M4=4, M5=4, M6=4, M7=0, M8=0; or,
M1=8, M2=8, M3=2, M4=4, M5=4, M6=4, M7=0, M8=0; or,
M1=8, M2=8, M3=2, M4=4, M5=4, M6=2, M7=2, M8=0; or,
M1=8, M2=8, M3=4, M4=4, M5=0, M6=0, M7=0, M8=0; or,
M1=8, M2=16, M3=2, M4=2, M5=0, M6=0, M7=0, M8=0; or,
M1=16, M2=8, M3=2, M4=2, M5=0, M6=0, M7=0, M8=0; or,
M1=12, M2=12, M3=2, M4=2, M5=0, M6=0, M7=0, M8=0.

When Mr=0, the Report Type comprises one status bit for indicating information of RI=r.

The Report Type is used to indicate one item in an information set formed by combination of the RI information and the PMI1 information, wherein the information set comprises: Mr pieces of code word index information when RI=r, wherein r=1, 2 . . . 4, and $$\sum_{r=1}^{4} Mr <= 32,$$

wherein the Mr pieces of code word index information is information of all or part of indexes in a PMI1 information set in an LTE codebook corresponding to RI=r.

When RI=r, wherein r=1, 2 . . . 4, the value of Mr is:
M1=12, M2=12, M3=4, M4=4; or,
M1=8, M2=16, M3=4, M4=4; or,
M1=16, M2=8, M3=4, M4=4; or,
M1=8, M2=8, M3=4, M4=4; or,
M1=8, M2=8, M3=2, M9=2; or,
M1=8, M2=8, M3=2, M4=4; or,
M1=8, M2=8, M3=4, M4=2.

When the sum of the Mr is not equal to 32, the other status bits in the Report Type are reserved status bits or are used to indicate other information.

The Report Type is used to indicate one item in an information set formed by combination of the RI information and the PMI1 information, wherein the information set comprises: Mr pieces of code word index information when RI=r, wherein r=1, 2, and $$\sum_{r=1}^{2} Mr <= 32,$$

wherein the Mr pieces of code word index information is information of all or part of indexes in a PMI1 information set in an LTE codebook corresponding to RI=r.

When RI=r, wherein r=1, 2, the value of Mr is: M1=16, M2=16.

Another aspect of the disclosure provides a method for channel information feedback, comprising: a terminal acquiring channel information, wherein the channel information comprises: PMI1 information and RI information; the terminal jointly encoding the PMI1 information and the RI information into a 4-bit Report Type; and the terminal feeding back the Report Type on a physical uplink control channel.

The Report Type is used to indicate one item in an information set formed by combination of the RI information and the PMI1 information, wherein the information set comprises: Mr pieces of code word index information when RI=r, wherein r=1, 2, and $$\sum_{r=1}^{2} Mr <= 16,$$

wherein the Mr pieces of code word index information is information of all or part of indexes in a PMI1 information set in an LTE codebook corresponding to RI=r.

Preferably, when RI=r, wherein r=1, 2, the value of Mr is: M1=8, M2=8.

Another aspect of the disclosure provides a terminal, comprising: a first acquiring module, configured to acquire channel information, wherein the channel information comprises: PMI1 information and RI information; a first encoding module, configured to jointly code the PMI1 information and the RI information in to a 5-bit Report Type; and a first feedback module, configured to feed back the Report Type on a physical uplink control channel.

Preferably, the Report Type is used to indicate one item in an information set formed by combination of the RI information and the PMI1 information, wherein the information set comprises: Mr pieces of code word index information when RI=r, wherein r=1, 2 . . . 8, and $$\sum_{r=1}^{8} Mr <= 32,$$

wherein the Mr pieces of code word index information is information of all or part of indexes of a PMI1 information set in an LTE codebook corresponding to RI=r.

Preferably, when RI=r, wherein r=1, 2 . . . 8, the value of Mr is:

M1=8, M2=8, M3=4, M4=4, M5=2, M6=2, M7=1, M8=1; or,
M1=8, M2=8, M3=2, M4=2, M5=4, M6=4, M7=2, M8=1; or,
M1=8, M2=8, M3=4, M4=2, M5=4, M6=4, M7=1, M8=1; or,
M1=8, M2=8, M3=2, M4=4, M5=4, M6=4, M7=1, M8=1; or,
M1=8, M2=8, M3=2, M4=4, M5=4, M6=2, M7=2, M8=1; or,
M1=8, M2=8, M3=4, M4=4, M5=1, M6=1, M7=1, M8=1; or,
M1=8, M2=16, M3=2, M4=2, M5=1, M6=1, M7=1, M8=1; or,
M1=16, M2=8, M3=2, M4=2, M5=1, M6=1, M7=1, M8=1; or,
M1=12, M2=12, M3=2, M4=2, M5=1, M6=1, M7=1, M8=1; or,
M1=8, M2=8, M3=4, M4=4, M5=2, M6=2, M7=0, M8=0; or,
M1=8, M2=8, M3=2, M4=2, M5=4, M6=4, M7=2, M8=0; or,
M1=8, M2=8, M3=4, M4=2, M5=4, M6=4, M7=0, M8=0; or,
M1=8, M2=8, M3=2, M4=4, M5=4, M6=4, M7=0, M8=0; or,
M1=8, M2=8, M3=2, M4=4, M5=4, M6=2, M7=2, M8=0; or,
M1=8, M2=8, M3=4, M4=4, M5=0, M6=0, M7=0, M8=0; or,
M1=8, M2=16, M3=2, M4=2, M5=0, M6=0, M7=0, M8=0; or,
M1=16, M2=8, M3=2, M4=2, M5=0, M6=0, M7=0, M8=0; or,
M1=12, M2=12, M3=2, M4=2, M5=0, M6=0, M7=0, M8=0.

Preferably, when Mr=0, the Report Type comprises one status bit for indicating information of RI=r.

Preferably, the Report Type is used to indicate one item in an information set formed by combination of the RI information and the PMI1 information, wherein the information set comprises: Mr pieces of code word index information when RI=r, wherein r=1, 2 . . . 4, and $$\sum_{r=1}^{4} Mr <= 32,$$

wherein the Mr pieces of code word index information is information of all or part of indexes in a PMI1 information set in an LTE codebook corresponding to RI=r.

Preferably, when RI=r, wherein r=1, 2 . . . 4, the value of Mr is:

M1=12, M2=12, M3=4, M4=4; or,
M1=8, M2=16, M3=4, M4=4; or,
M1=16, M2=8, M3=4, M4=4; or,
M1=8, M2=8, M3=4, M4=4; or,
M1=8, M2=8, M3=2, M4=2; or,
M1=8, M2=8, M3=2, M4=4; or,
M1=8, M2=8, M3=4, M4=2.

Preferably, the Report Type is used to indicate one item in an information set formed by combination of the RI information and the PMI1 information, wherein the information set comprises: Mr pieces of code word index information when RI=r, wherein r=1, 2, and $$\sum_{r=1}^{2} Mr <= 32,$$

wherein the Mr pieces of code word index information is information of all or part of indexes in a PMI1 information set in an LTE codebook corresponding to RI=r.

Preferably, when RI=r, wherein r=1, 2, the value of Mr: M1=16, M2=16.

Another aspect of the disclosure provides a terminal, comprising: a second acquiring module, configured to acquire channel information, wherein the channel information comprises: PMI1 information and RI information; a second encoding module, configured to jointly encode the PMI1 information and the RI information into a 4-bit Report Type; and a second feedback module, configured to feed back the Report Type on a physical uplink control channel.

The Report Type is used to indicate one item in an information set formed by combination of the RI information and the PMI1 information, wherein the information set comprises: Mr pieces of code word index information when RI=r, wherein r=1, 2, and $$\sum_{r=1}^{2} Mr <= 16,$$

wherein the Mr pieces of code word index information is information of all or part of indexes in a PMI1 information set in an LTE codebook corresponding to RI=r.

When RI=r, wherein r=1, 2, the value of Mr is: M1=8, M2=8.

Through the disclosure, the PMI1 and RI in the channel information are jointly encoded into a 4-bit or 5-bit Report Type and then fed back, which solves the problem of the poor system transmission performance caused by high overhead of channel information feedback in the related arts, thus improving the channel information feedback performance of a terminal and further improving the system transmission performance.

BRIEF DESCRIPTION OF THE ACCOMPANYING FIGURES

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The disclosure will be further illustrated hereinafter in conjunction with the exemplary embodiments and accompanying drawings. It shall be noted that the embodiments in this application and the features in the embodiments can be mutually combined if there is no conflict.

Figure 1:
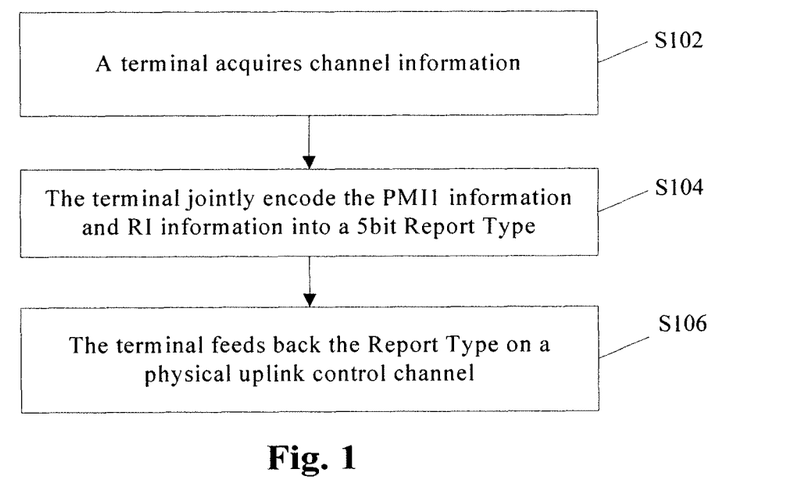
FIG. 1 is a first flow chart of the method for channel feedback according to an embodiment of the disclosure.

This embodiment provides a method for channel information feedback. FIG. 1 is the first flow chart of the method for channel feedback according to the embodiment of the disclosure. As shown in FIG. 1, this method comprises:

Step S102: a terminal acquires channel information, wherein the channel information comprises PMI1 information and RI information;

Step S104: the terminal jointly encodes the PMI1 information and the RI information into a 5-bit Report Type; and Step S106: the terminal feeds back the Report Type on a physical uplink control channel.

Through the steps above, PMI1 and RI in the channel information are jointly encoded into a 5-bit Report Type and fed back, which solves the problem of the poor system transmission performance in the related arts caused by high overhead of channel information feedback, reduces the overhead of the channel information feedback, and improves the performance of the terminal to feedback channel information, thus improving the transmission performance of the system.

Preferably, the Report Type is used to indicate one item in an information set formed by combination of the RI information and the PMI1 information, wherein the information set comprises: Mr pieces of code word index information when RI=r, wherein r=1, 2 . . . 8, and $$\sum_{r=1}^{8} Mr <= 32,$$

wherein the Mr pieces of code word index information is information of all or part of indexes in a PMI1 information set in an LTE codebook corresponding to RI=r. Through this preferable embodiment, in the LTE-A system, the number of the code word index information corresponding to RI=1-8 on the physical uplink control channel is limited to be less than or equal to 32, which reduces the feedback overhead of the system, avoids the rise of bit error rate limit of the Report Type when the overhead exceeds 5 bits, and improves the performance of channel information feedback.

Preferably, when RI=r, wherein r=1, 2 . . . 8, the value of Mr is:

M1=8, M2=8, M3=4, M4=4, M5=2, M6=2, M7=1, M8=1; or,
M1=8, M2=8, M3=2, M4=2, M5=4, M6=4, M7=2, M8=1; or,
M1=8, M2=8, M3=4, M4=2, M5=4, M6=4, M7=1, M8=1; or,
M1=8, M2=8, M3=2, M4=4, M5=4, M6=4, M7=1, M8=1; or
M1=8, M2=8, M3=2, M4=4, M5=4, M6=2, M7=2, M8=1; or,
M1=8, M2=8, M3=4, M4=4, M5=1, M6=1, M7=1, M8=1; or,
M1=8, M2=16, M3=2, M4=2, M5=1, M6=1, M7=1, M8=1; or,
M1=16, M2=8, M3=2, M4=2, M5=1, M6=1, M7=1, M8=1; or,
M1=12, M2=12, M3=2, M4=2, M5=1, M6=1, M7=1, M8=1; or,
M1=8, M2=8, M3=4, M4=4, M5=2, M6=2, M7=0, M8=0; or,
M1=8, M2=8, M3=2, M4=2, M5=4, M6=4, M7=2, M8=0; or,

M1=8, M2=8, M3=4, M4=2, M5=4, M6=4, M7=0, M8=0; or,

M1=8, M2=8, M3=2, M4=4, M5=4, M6=4, M7=0, M8=0; or,

M1=8, M2=8, M3=2, M4=4, M5=4, M6=2, M7=2, M8=0; or,

M1=8, M2=8, M3=4, M4=4, M5=0, M6=0, M7=0, M8=0; or,

M1=8, M2=16, M3=2, M4=2, M5=0, M6=0, M7=0, M8=0; or,

M1=16, M2=8, M3=2, M4=2, M5=0, M6=0, M7=0, M8=0; or,

M1=12, M2=12, M3=2, M4=2, M5=0, M6=0, M7=0, M8=0.

Preferably, when Mr=0, the Report Type comprises one status bit for indicating information of RI=r.

In accordance with this preferable embodiment, through the method above, the sum of the code word index information acquired through jointly encoding RI (1-8) and part of the PMI1 information by the terminal is less than 32, so the information could be fed back with 5 bits, thus improving the precision and overhead of channel information feedback.

Preferably, the Report Type above is used to indicate one item in an information set formed by combination of the RI information and the PMI1 information, wherein the information set comprises: Mr pieces of code word index information when RI=r, wherein r=1, 2 ... 4, and $$\sum_{r=1}^{4} Mr <= 32,$$

wherein the Mr pieces of code word index information refers to the information of Mr indexes in the first code word index PMI1 in the LTE codebook corresponding to RI=r. Through this embodiment, in the LTE-A system, when using 8 Tx, the RI fed back on the physical uplink control channel is limited to be no more than 4, and the number of the code word index information corresponding to RI=1-4 is limited to be 32, which reduces the feedback overhead of the system and improves the performance of the channel information feedback.

Preferably, for the above Report Type, when RI=r, wherein r=1, 2 ... 4, the value of Mr is:

M1=12, M2=12, M3=4, M4=4; or,

M1=8, M2=16, M3=4, M4=4; or,

M1=16, M2=8, M3=4, M4=4; or,

M1=8, M2=8, M3=4, M4=4; or,

M1=8, M2=8, M3=2, M4=2; or,

M1=8, M2=8, M3=2, M4=4; or,

M1=8, M2=8, M3=4, M4=2.

In accordance with this preferable embodiment, through the method above, the sum of the code word index information acquired through jointly encoding RI (1-4) and PMI1 information by the terminal is less than 32, so the information could be fed back with 5 bits, thus improving the precision and overhead of the channel information feedback.

Preferably, the Report Type above is used to indicate one item in an information set formed by combination of the RI information and the PMI1 information, wherein the information set comprises: Mr pieces of code word index information when RI=r, wherein r=1, 2, and $$\sum_{r=1}^{2} Mr <= 32,$$

wherein the Mr pieces of code word index information refers to the information of Mr indexes in the first code word index PMI1 in the LTE codebook corresponding to RI=r. Through this embodiment, in the LTE-A system, the number of the code word index information corresponding to RI=1-2 is limited to be 32, which reduces the feedback overhead of the system and improves the performance of the channel information feedback.

Preferably, for the above Report Type, when RI=r, wherein r=1, 2, the value of Mr is: M1=16, M2=16. Through this preferable embodiment, the sum of the code word index information acquired through jointly encoding RI (1-2) and the PMI1 information by the terminal is less than 32, so the information could be fed back through 5 bits, thus improving the precision and overhead of channel information feedback.

Preferably, when the sum of the Mr is not equal to 32, the other status bits in the Report Type are reserved status bits or are used to indicate other information.

Figure 2:
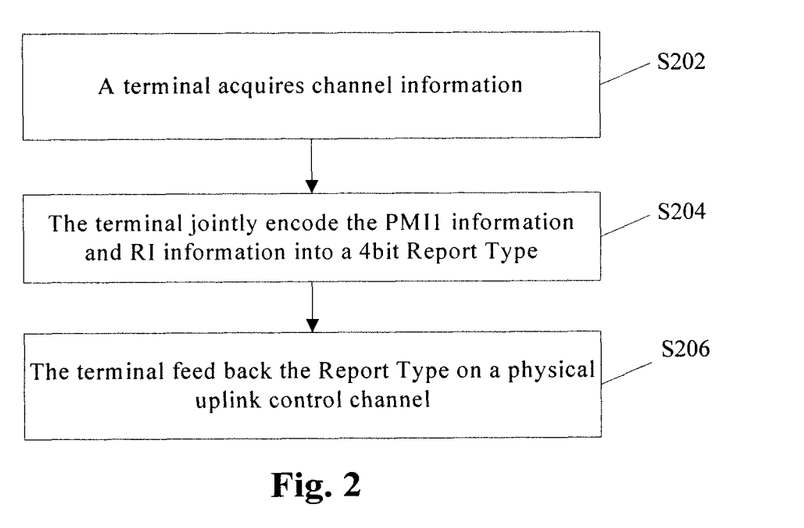
FIG. 2 is a second flow chart of the method for channel feedback according to an embodiment of the disclosure.

This embodiment provides a method for channel information feedback. FIG. 2 is the second flow chart of the method for channel feedback according to the embodiment of the disclosure. As shown in FIG. 2, this method comprises:

Step S202: a terminal acquires channel information, wherein the channel information comprises PMI1 information and RI information;

Step S204: the terminal jointly encodes the PMI1 information and the RI information into a 4-bit Report Type; and Step S206: the terminal feeds back the Report Type on a physical uplink control channel.

Through the steps above, PMI1 and RI in the channel information are jointly coded into a 4-bit Report Type and fed back, which solves the problem that the system transmission performance is greatly influenced by the high overhead of channel information feedback in the related arts, reduces the overhead of the channel information feedback, and improves the performance of the terminal to feed back channel information, thus improving the transmission performance of the system.

Preferably, the Report Type above is used to indicate one item in an information set formed by combination of the RI information and the PMI1 information, wherein the information set comprises: Mr pieces of code word index information when RI=r, wherein r=1, 2, and $$\sum_{r=1}^{2} Mr <= 16,$$

wherein the Mr pieces of code word index information refers to the information of Mr indexes in the PMI1 in the LTE codebook corresponding to RI=r. Through this preferable embodiment, in the LTE-A system, the number of the code word index information corresponding to RI=1-2 is limited to be 16 which reduces the feedback overhead of the system and improves the performance of the channel information feedback.

Preferably, when RI=r, wherein r=1, 2, the value of Mr is: M1=8, M2=8. In accordance with this preferable embodiment, through the method above, the sum of the code word index information acquired through encoding RI (1-2) and the PMI1 information by the terminal is less than 16, so the information could be fed back with 4 bits, thus improving the precision and overhead of the channel information feedback.

It shall be noted that the M(r) in the above embodiments is an integer (r=1, 2, . . . 8). If Mr=11, it is considered to be equivalent to only containing the information of RI=r.

Embodiment 1

This embodiment, combining the above embodiment and the preferable implementation methods therein, provides a method for channel information feedback. In the LTE-A system, under the transmission mode that supports closed-loop spatial multiplexing, a UE is required to be configured as a certain feedback model to feed back channel information. This embodiment realizes the joint encoding of PMI1 and RI in the channel information into a 5-bit Report Type and the feedback of the channel information. This method comprises the following steps.

Step 1: the UE acquires the channel information according to channel estimation first, determines the values of RI, PMI1 and PMI2, and the information of CQI according to the channel information so as to represent the channel information of various current resource granularities, wherein the resource granularities can be broadband, subband, multiple subbands, all the subbands on one carrier when carrier aggregation happens and other resource granularities.

Step 2: the UE uses multiple Report Types to feed back the above channel information at different moments. A Report Type comprising the joint encoding information of the RI and PMI1 is acquired by adopting the joint encoding method of the PMI1 and RI as shown in Table 7, and the Report Type is a piece of 5-bit information.

TABLE 6

Schematic table of the codebook defined in the LTE-A

| RI | Codebook size |
|---|---|
| RI = 1 | $i_1$: 16 indexes<br>$i_2$: 16 indexes |
| RI = 2 | $i_1$: 16 indexes<br>$i_2$: 16 indexes |
| RI = 3 | $i_1$: 4 indexes<br>$i_2$: 16 indexes |
| RI = 4 | $i_1$: 4 indexes<br>$i_2$: 8 indexes |
| RI = 5 | i (represented as $i_1$) 4 indexes, the other one is a fixed index |
| RI = 6 | i (represented as $i_1$) 4 indexes, the other one is a fixed index |
| RI = 7 | i (represented as $i_1$) 4 indexes, the other one is a fixed index |
| RI = 8 | Fixed index |

TABLE 7

Schematic table of the joint encoding of PMI1 and RI
The jointly encoded information of RI and part of $i_1$ in the codebook corresponding to each RI amounts to 5 bits RI = 1: 8 states among 16 states of $i_1$
RI = 2: 8 states among 16 states of $i_1$
RI = 3: 4 states of $i_1$
RI = 4: 4 states of $i_1$
RI = 5: 2 states among 4 states of $i_1$
RI = 6: 2 states among 4 states of $i_1$
RI = 7: 2 states among 4 states of $i_1$
RI = 8: 1 state of $i_1$
The remaining 1 status bit Preferably, in this embodiment, the method of selecting the 8 states from the 16 states of $i_1$ when RI=1 expressed in the joint encoding is one of the methods below: 8 code words whose indexes are even, 8 code words whose indexes are odd, the first 8 code words and the last 8 code words in the codebook defined in the LTE-A.

Preferably, in this embodiment, the method of selecting the 8 states from the 16 states of $i_1$ when RI=2 expressed in the joint encoding is one of the methods below: 8 code words whose indexes are even, 8 code words whose indexes are odd, the first 8 code words and the last 8 code words in the codebook defined in the LTE-A.

Preferably, in this embodiment, the method of selecting the 2 states from the 4 states of $i_1$ when RI=5 expressed in the joint encoding is one of the methods below: 2 code words whose indexes are even, 2 code words whose indexes are odd, the first 2 code words and the last 2 code words in the codebook defined in the LTE-A.

Embodiment 2

This embodiment, combining the above embodiment and the preferable implementation methods therein, provides a method for channel information feedback. In the LTE-A system, under the transmission mode that supports closed-loop spatial multiplexing, a UE is required to be configured as a certain feedback model to feed back channel information. This embodiment realizes the joint encoding of PMI1 and RI in the channel information into a 5-bit Report Type and the feedback of the channel information. This method comprises the following steps.

Step 1: the UE acquires the channel information according to channel estimation first, determines the values of RI, PMI1 and PMI2, and the information of CQI according to the channel information so as to represent the channel information of various current resource granularities, wherein the resource granularities can be broadband, subband, multiple subbands, all the subbands on one carrier when carrier aggregation happens and other resource granularities.

Step 2: the UE uses multiple Report Types to feed back the above channel information at different moments. A Report Type comprising the joint encoding information of the RI and PMI1 is acquired by adopting the joint encoding method of the PMI1 and RI as shown in Table 8, and the Report Type is a piece of 5-bit information.

TABLE 8

Schematic table of the joint encoding of PMI1 and RI
The jointly encoded information of RI and part of $i_1$ in the codebook corresponding to each RI amounts to 5 bits RI = 1: 8 states among 16 states of $i_1$
RI = 2: 8 states among 16 states of $i_1$
RI = 3: 2 states among 4 states of $i_1$
RI = 4: 2 states among 4 states of $i_1$
RI = 5: 4 states of $i_1$
RI = 6: 4 states of $i_1$
RI = 7: 2 states among 4 states of $i_1$
RI = 8: 1 state of $i_1$
The remaining 1 status bit Preferably, in this embodiment, the method of selecting the 8 states from the 16 states of $i_1$ when RI=1 expressed in the joint encoding is one of the methods below: 8 code words whose indexes are even, 8 code words whose indexes are odd, the first 8 code words and the last 8 code words in the codebook defined in the LTE-A.

Preferably, in this embodiment, the method of selecting the 8 states from the 16 states of $i_1$ when RI=2 expressed in the joint encoding is one of the methods below: 8 code words whose indexes are even, 8 code words whose indexes are odd, the first 8 code words and the last 8 code words in the codebook defined in the LTE-A.

Preferably, in this embodiment, the method of selecting the 2 states from the 4 states of $i_1$ when RI=3, 4, 7 expressed in the joint encoding is one of the methods below: 2 code words whose indexes are even, 2 code words whose indexes are odd, the first 2 code words and the last 2 code words in the codebook defined in the LTE-A.

Embodiment 3

This embodiment, combining the above embodiment and the preferable implementation methods therein, provides a method for channel information feedback. In the LTE-A system, under the transmission mode that supports closed-loop spatial multiplexing, a UE is required to be configured as a certain feedback model to feed back channel information. This embodiment realizes the joint encoding of PMI1 and RI in the channel information into a 5-bit Report Type and the feedback of the channel information. This method comprises the following steps.

Step 1: the UE acquires the channel information according to channel estimation first, determines the values of RI, PMI1 and PMI2, and the information of CQI according to the channel information so as to represent the channel information of various current resource granularities, wherein the resource granularities can be broadband, subband, multiple subbands, all the subbands on one carrier when carrier aggregation happens and other resource granularities.

Step 2: the UE uses multiple Report Types to feed back the above channel information at different moments. A Report Type comprising the joint encoding information of the RI and PMI1 is acquired by adopting the joint encoding method of the PMI1 and RI as shown in Table 9, and the Report Type is a piece of 5-bit information.

TABLE 9

Schematic table of the joint encoding of PMI1 and RI
The jointly encoded information of RI and part of $i_1$ in the
codebook corresponding to each RI amounts to 5 bits RI = 1: 8 states among 16 states of $i_1$
RI = 2: 8 states among 16 states of $i_1$
RI = 3: 4 states of $i_1$
RI = 4: 2 states among 4 states of $i_1$
RI = 5: 4 states of $i_1$
RI = 6: 4 states of $i_1$
RI = 7: 1 state among 4 states of $i_1$
RI = 8: 1 state of $i_1$ Preferably, in this embodiment, the method of selecting the 8 states from the 16 states of $i_1$ when RI=1 expressed in the joint encoding is one of the following methods: 8 code words whose indexes are even, 8 code words whose indexes are odd, the first 8 code words and the last 8 code words in the codebook defined in the LTE-A.

Preferably, in this embodiment, the method of selecting the 8 states from the 16 states of $i_1$ when RI=2 expressed in the joint encoding is one of the following methods: 8 code words whose indexes are even, 8 code words whose indexes are odd, the first 8 code words and the last 8 code words in the codebook defined in the LTE-A.

Preferably, in this embodiment, the method of selecting the 2 states from the 4 states of $i_1$ when RI=4 expressed in the joint encoding is one of the following methods: 2 code words whose indexes are even, 2 code words whose indexes are odd, the first 2 code words and the last 2 code words in the codebook defined in the LTE-A.

Preferably, in this embodiment, the method of selecting the 1 state from the 4 states of $i_1$ when RI=7 expressed in the joint encoding is one of the following methods: the code word whose index is 0 or 2 in the codebook defined in the LTE-A.

Embodiment 4

This embodiment, combining the above embodiment and the preferable implementation methods therein, provides a method for channel information feedback. In the LTE-A system, under the transmission mode that supports closed-loop spatial multiplexing, a UE is required to be configured as a certain feedback model to feed back channel information. This embodiment realizes the joint encoding of PMI1 and RI in the channel information into a 5-bit Report Type and the feedback of the channel information. This method comprises the following steps.

Step 1: the UE acquires the channel information according to channel estimation first, determines the values of RI, PMI1 and PMI2, and the information of CQI according to the channel information so as to represent the channel information of various current resource granularities, wherein the resource granularities can be broadband, subband, multiple subbands, all the subbands on one carrier when carrier aggregation happens and other resource granularities.

Step 2: the UE uses multiple Report Types to feed back the above channel information at different moments. A Report Type comprising the joint encoding information of the RI and PMI1 is acquired by adopting the joint encoding method of the PMI1 and RI as shown in Table 10, and the Report Type is a piece of 5-bit information.

TABLE 10

Schematic table of the joint encoding of PMI1 and RI
The jointly encoded information of RI and part of $i_1$ in
the codebook corresponding to each RI amounts to 5 bits RI = 1: 8 states among 16 states of $i_1$
RI = 2: 8 states among 16 states of $i_1$
RI = 3: 2 states of 4 states of $i_1$
RI = 4: 4 states of $i_1$
RI = 5: 4 states of $i_1$
RI = 6: 4 states of $i_1$
RI = 7: 1 state among 4 states of $i_1$
RI = 8: 1 state of $i_1$ Preferably, in this embodiment, the method of selecting the 8 states from the 16 states of $i_1$ when RI=1 expressed in the joint encoding is one of the following methods: 8 code words whose indexes are even, 8 code words whose indexes are odd, the first 8 code words and the last 8 code words in the codebook defined in LTE-A.

Preferably, in this embodiment, the method of selecting the 8 states from the 16 states of $i_1$ when RI=2 expressed in the joint encoding is one of the following methods: 8 code words whose indexes are even, 8 code words whose indexes are odd, the first 8 code words and the last 8 code words in the codebook defined in LTE-A.

Preferably, in this embodiment, the method of selecting the 2 states from the 4 states of $i_1$ when RI=3 expressed in the joint encoding is one of the methods below: 2 code words whose indexes are even, 2 code words whose indexes are odd, the first 2 code words and the last 2 code words in the codebook defined in LTE-A.

Preferably, in this embodiment, the method of selecting the 1 state from the 4 states of $i_1$ when RI=7 expressed in the joint encoding is one of the methods below: the code word whose index is 0 or 2 in the codebook defined in LTE-A.

Embodiment 5

This embodiment, combining the above embodiment and the preferable implementation methods therein, provides a method for channel information feedback. In the LTE-A system, under the transmission mode that supports closed-loop spatial multiplexing, a UE is required to be configured as a certain feedback model to feed back channel information. This embodiment realizes the joint encoding of PMI1 and RI in the channel information into a 5-bit Report Type and the feedback of the channel information. This method comprises the following steps.

Step 1: the UE acquires the channel information according to channel estimation first, determines the values of RI, PMI1 and PMI2, and the information of CQI according to the channel information so as to represent the channel information of various current resource granularities, wherein the resource granularities can be broadband, subband, multiple subbands, all the subbands on one carrier when carrier aggregation happens and other resource granularities.

Step 2: the UE uses multiple Report Types to feed back the above channel information at different moments. A Report Type comprising the joint encoding information of the RI and PMI1 is acquired by adopting the joint encoding method of the PMI1 and RI as shown in Table 11, and the Report Type is a piece of 5-bit information.

TABLE 11

Schematic table of the joint encoding of PMI1 and RI
The jointly encoded information of RI and part of $i_1$ in the codebook corresponding to each RI amounts to 5 bits RI = 1: 8 states among 16 states of $i_1$
RI = 2: 8 states among 16 states of $i_1$
RI = 3: 2 states among 4 states of $i_1$
RI = 4: 4 states of $i_1$
RI = 5: 4 states of $i_1$
RI = 6: 2 states among 4 states of $i_1$
RI = 7: 2 states among 4 states of $i_1$
RI = 8: 1 state of $i_1$
The remaining 1 status bit Preferably, in this embodiment, the method of selecting the 8 states from the 16 states of $i_1$ when RI=1 expressed in the joint encoding is one of the following methods: 8 code words whose indexes are even, 8 code words whose indexes are odd, the first 8 code words and the last 8 code words in the codebook defined in the LTE-A.

Preferably, in this embodiment, the method of selecting the 8 states from the 16 states of $i_1$ when RI=2 expressed in the joint encoding in the joint encoding is one of the following methods: 8 code words whose indexes are even, 8 code words whose indexes are odd, the first 8 code words and the last 8 code words in the codebook defined in the LTE-A.

Preferably, in this embodiment, the method of selecting the 2 states from the 4 states of $i_1$ when RI=3 expressed in the joint encoding is one of the following methods: 2 code words whose indexes are even, 2 code words whose indexes are odd, the first 2 code words and the last 2 code words in the codebook defined in the LTE-A.

Preferably, in this embodiment, the method of selecting the 2 states from the 4 states of $i_1$ when RI=6, 7 expressed in the joint encoding is one of the following methods below: the code word whose index is 0 and the code word whose index is 2, 2 code words whose indexes are odd, the first 2 code words and the last 2 code words in the codebook defined in the LTE-A.

Embodiment 6

This embodiment, combining the above embodiment and the preferable implementation methods therein, provides a method for channel information feedback. In the LTE-A system, under the transmission mode that supports closed-loop spatial multiplexing, a UE is required to be configured as a certain feedback model to feed back channel information. This embodiment realizes the joint encoding of PMI1 and RI in the channel information into a 5-bit Report Type and the feedback of the channel information. This method comprises the following steps.

Step 1: the UE acquires the channel information according to channel estimation first, determines the values of RI, PMI1 and PMI2, and the information of CQI according to the channel information so as to represent the channel information of various current resource granularities, wherein the resource granularities can be broadband, subband, multiple subbands, all the subbands on one carrier when carrier aggregation happens and other resource granularities.

Step 2: the UE uses multiple Report Types to feed back the above channel information at different moments. A Report Type comprising the joint encoding information of the RI and PMI1 is acquired by adopting the joint encoding method of the PMI1 and RI as shown in Table 12, and the Report Type is a piece of 5-bit information.

TABLE 12

Schematic table of the joint encoding of PMI1 and RI
The jointly encoded information of RI and part of $i_1$ in the codebook corresponding to each RI amounts to 5 bits RI = 1: 8 states among 16 states of $i_1$
RI = 2: 8 states among 16 states of $i_1$
RI = 3: 4 states of $i_1$
RI = 4: 4 states of $i_1$
RI = 5: 1 state of $i_1$
RI = 6: 1 state of $i_1$
RI = 7: 1 state of $i_1$
RI = 8: 1 state of $i_1$ Preferably, in this embodiment, the method of selecting the 8 states from the 16 states of $i_1$ when RI=1 as expressed in the joint encoding is one of the following methods: 8 code words whose indexes are even, 8 code words joint encoding odd, the first 8 code words and the last 8 code words in the codebook defined in the LTE-A.

Preferably, in this embodiment, the method of selecting the 8 states from the 16 states of $i_1$ when RI=2 as expressed in the joint encoding is one of the following methods: 8 code words whose indexes are even, 8 code words whose indexes are odd, the first 8 code words and the last 8 code words in the codebook defined in the LTE-A.

Preferably, in this embodiment, the method of selecting the 2 states from the 4 states of $i_1$ when RI=3, 4 as expressed in the joint encoding is one of the methods below: 2 code words whose indexes are even, 2 code words whose indexes are odd, the first 2 code words and the last 2 code words in the codebook defined in the LTE-A.

Embodiment 7

This embodiment, combining the above embodiment and the preferable implementation methods therein, provides a method for channel information feedback. In the LTE-A system, under the transmission mode that supports closed-loop spatial multiplexing, a UE is required to be configured as a certain feedback model to feed back channel information. This embodiment realizes the joint encoding of PMI1 and RI in the channel information into a 5-bit Report Type and the feedback of the channel information. This method comprises the following steps.

Step 1: the UE acquires the channel information according to channel estimation first, determines the values of RI, PMI1 and PMI2, and the information of CQI according to the channel information so as to represent the channel information of various current resource granularities, wherein the resource granularities can be broadband, subband, multiple subbands, all the subbands on one carrier when carrier aggregation happens and other resource granularities.

Step 2: the UE uses multiple Report Types to feed back the above channel information at different moments. A Report Type comprising the joint encoding information of the RI and PMI1 is acquired by adopting the joint encoding method of the PMI1 and RI as shown in Table 13, and the Report Type is a piece of 5-bit information.

TABLE 13

Schematic table of the joint encoding of PMI1 and RI
The jointly encoded information of RI and part of $i_1$ in the
codebook corresponding to each RI amounts to 5 bits RI = 1: 8 states among 16 states of $i_1$
RI = 2: 16 states of $i_1$
RI = 3: 2 states among 4 states of $i_1$
RI = 4: 2 states among 4 states of $i_1$
RI = 5: 1 state of $i_1$
RI = 6: 1 state of $i_1$
RI = 7: 1 state of $i_1$
RI = 8: 1 state of $i_1$ Preferably, in this embodiment, the 8 states among the 16 states of $i_1$ when RI=1 expressed in the joint encoding are the 8 code words whose indexes are even, or the 8 code words whose indexes are odd, or the first 8 code words, or the last 8 code words in the codebook defined in the LTE-A.

Preferably, in this embodiment, the 2 states among the 4 states when RI=3, 4 expressed in the joint encoding are the 2 code words whose indexes are even, or the 2 code words whose indexes are odd, or the first 2 code words, or the last 2 code words in the codebook defined in the LTE-A.

Embodiment 8

This embodiment, combining the above embodiment and the preferable implementation methods therein, provides a method for channel information feedback. In the LTE-A system, under the transmission mode that supports closed-loop spatial multiplexing, a UE is required to be configured as a certain feedback model to feed back channel information. This embodiment realizes the joint encoding of PMI1 and RI in the channel information into a 5-bit Report Type and the feedback of the channel information. This method comprises the following steps.

Step 1: the UE acquires the channel information according to channel estimation first, determines the values of RI, PMI1 and PMI2, and the information of CQI according to the channel information so as to represent the channel information of various current resource granularities, wherein the resource granularities can be broadband, subband, multiple subbands, all the subbands on one carrier when carrier aggregation happens and other resource granularities.

Step 2: the UE uses multiple Report Types to feed back the above channel information at different moments. A Report Type comprising the joint encoding information of the RI and PMI1 is acquired by adopting the joint encoding method of the PMI1 and RI as shown in Table 14, and the Report Type is a piece of 5-bit information.

TABLE 14

Schematic table of the joint encoding of PMI1 and RI
The jointly encoded information of RI and part of $i_1$ in the
codebook corresponding to each RI amounts to 5 bits RI = 1: 16 states of $i_1$
RI = 2: 8 states among 16 states of $i_1$
RI = 3: 2 states among 4 states of $i_1$
RI = 4: 2 states among 4 states of $i_1$
RI = 5: 1 state of $i_1$
RI = 6: 1 state of $i_1$
RI = 7: 1 state of $i_1$
RI = 8: 1 state of $i_1$ Preferably, in this embodiment, the method of selecting the 8 states from the 16 states of $i_1$ when RI=2 expressed in the joint encoding is one of the following methods below: 8 code words whose indexes are even, 8 code words whose indexes are odd, the first 8 code words and the last 8 code words in the codebook defined in the LTE-A.

Preferably, in this embodiment, the method of selecting the 2 states among the 4 states of $i_1$ when RI=3, 4 expressed in the joint encoding is one of the following methods: 2 code words whose indexes are even, 2 code words whose indexes are odd, the first 2 code words and the last 2 code words in the codebook defined in the LTE-A.

Embodiment 9

This embodiment, combining the above embodiment and the preferable implementation methods therein, provides a method for channel information feedback. In the LTE-A system, under the transmission mode that supports closed-loop spatial multiplexing, a UE is required to be configured as a certain feedback model to feed back channel information. This embodiment realizes the joint encoding of PMI1 and RI in the channel information into a 5-bit Report Type and the feedback of the channel information. This method comprises the following steps.

Step 1: the UE acquires the channel information according to channel estimation first, determines the values of RI, PMI1 and PMI2, and the information of CQI according to the channel information so as to represent the channel information of various current resource granularities, wherein the resource granularities can be broadband, subband, multiple subbands, all the subbands on one carrier when carrier aggregation happens and other resource granularities.

Step 2: the UE uses multiple Report Types to feed back the above channel information at different moments. A Report Type comprising the joint encoding information of the RI and PMI1 is acquired by adopting the joint encoding method of the PMI1 and RI as shown in Table 15, and the Report Type is a piece of 5-bit information.

TABLE 15

Schematic table of joint encoding of PMI1 and RI
The jointly encoded information of RI and part of $i_1$ in the
codebook corresponding to each RI amounts to 5 bits RI = 1: 12 states among 16 states of $i_1$
RI = 2: 12 states among 16 states of $i_1$
RI = 3: 2 states among 4 states of $i_1$
RI = 4: 2 states among 4 states of $i_1$
RI = 5: 1 state of $i_1$
RI = 6: 1 state of $i_1$
RI = 7: 1 state of $i_1$
RI = 8: 1 state of $i_1$ Embodiment 10

This embodiment, combining the above embodiment and the preferable implementation methods therein, provides a method for channel information feedback. In the LTE-A system, under the transmission mode that supports closed-loop spatial multiplexing, a UE is required to be configured as a certain feedback model to feed back channel information. This embodiment realizes the joint encoding of PMI1 and RI in the channel information into a 5-bit Report Type and the feedback of the channel information. This method comprises the following steps.

Step 1: the UE acquires the channel information according to channel estimation first, determines the values of RI, PMI1 and PMI2, and the information of CQI according to the channel information so as to represent the channel information of various current resource granularities, wherein the resource granularities can be broadband, subband, multiple subbands, all the subbands on one carrier when carrier aggregation happens and other resource granularities.

Step 2: the UE uses multiple Report Types to feed back the above channel information at different moments. A Report Type comprising the joint encoding information of the RI and PMI1 is acquired by adopting the joint encoding method of the PMI1 and RI as shown in Table 16, and the Report Type is a piece of 5-bit information.

TABLE 16

Schematic table of the joint encoding of PMI1 and RI
The jointly encoded information of part of RIs and part of
$i_1$ in the codebook corresponding to each RI amounts to 5
bits RI = 1: 12 states among 16 states of $i_1$
RI = 2: 12 states among 16 states of $i_1$
RI = 3: 4 states of $i_1$
RI = 4: 4 states of $i_1$ What requires explanation is: in this embodiment, RI is limited to be no more than 4.

Embodiment 11

This embodiment, combining the above embodiment and the preferable implementation methods therein, provides a method for channel information feedback. In the LTE-A system, under the transmission mode that supports closed-loop spatial multiplexing, a UE is required to be configured as a certain feedback model to feed back channel information. This embodiment realizes the joint encoding of PMI1 and RI in the channel information into a 5-bit Report Type and the feedback of the channel information. This method comprises the following steps.

Step 1: the UE acquires the channel information according to channel estimation first, determines the values of RI, PMI1 and PMI2, and the information of CQI according to the channel information so as to represent the channel information of various current resource granularities, wherein the resource granularities can be broadband, subband, multiple subbands, all the subbands on one carrier when carrier aggregation happens and other resource granularities.

Step 2: the UE uses multiple Report Types to feed back the above channel information at different moments. A Report Type comprising the joint encoding information of the RI and PMI1 is acquired by adopting the joint encoding method of the PMI1 and RI as shown in Table 17, and the Report Type is a piece of 5-bit information.

TABLE 17

Schematic table of the joint encoding of PMI1 and RI
The jointly encoded information of part of RIs and part of $i_1$
in the codebook corresponding to each RI amounts to 5 bits RI = 1: 8 states among 16 states of $i_1$
RI = 2: 16 states of $i_1$
RI = 3: 4 states of $i_1$
RI = 4: 4 states of $i_1$ What requires explanation is: in this embodiment, RI is limited to be no more than 4.

Embodiment 12

This embodiment, combining the above embodiment and the preferable implementation methods therein, provides a method for channel information feedback. In the LTE-A system, under the transmission mode that supports closed-loop spatial multiplexing, a UE is required to be configured as a certain feedback model to feed back channel information. This embodiment realizes the joint encoding of PMI1 and RI in the channel information into a 5-bit Report Type and the feedback of the channel information. This method comprises the following steps.

Step 1: the UE acquires the channel information according to channel estimation first, determines the values of RI, PMI1 and PMI2, and the information of CQI according to the channel information so as to represent the channel information of various current resource granularities, wherein the resource granularities can be broadband, subband, multiple subbands, all the subbands on one carrier when carrier aggregation happens and other resource granularities.

Step 2: the UE uses multiple Report Types to feed back the above channel information at different moments. A Report Type comprising the joint encoding information of the RI and PMI1 is acquired by adopting the joint encoding method of the PMI1 and RI as shown in Table 18, and the Report Type is a piece of 5-bit information.

TABLE 18

Schematic table of the joint encoding of PMI1 and RI
The jointly encoded information of part of RIs and part of $i_1$
in the codebook corresponding to each RI amounts to 5 bits 16 states of $i_1$ when RI = 1
8 states among the 16 states of $i_1$ when RI = 2
4 states of $i_1$ when RI = 3
4 states of $i_1$ when RI = 4

What requires explanation is: in this embodiment, RI is limited to be no more than 4.

Embodiment 13

This embodiment, combining the above embodiment and the preferable implementation methods therein, provides a method for channel information feedback. In the LTE-A system, under the transmission mode that supports closed-loop spatial multiplexing, a UE is required to be configured as a certain feedback model to feed back channel information. This embodiment realizes the joint encoding of PMI1 and RI in the channel information into a 4-bit Report Type and the feedback of the channel information. This method comprises the following steps.

Step 1: the UE acquires the channel information according to channel estimation first, determines the values of RI, PMI1 and PMI2, and the information of CQI according to the channel information so as to represent the channel information of various current resource granularities, wherein the resource granularities can be broadband, subband, multiple subbands, all the subbands on one carrier when carrier aggregation happens and other resource granularities.

Step 2: the UE uses multiple Report Types to feed back the above channel information at different moments. A Report Type comprising the joint encoding information of the RI and PMI1 is acquired by adopting the joint encoding method of the PMI1 and RI as shown in Table 20, and the Report Type is a piece of 4-bit information.

TABLE 19

Schematic table of the joint encoding of PMI1 and RI
The jointly encoded information of part of RIs and
part of $i_1$ in the codebook corresponding to each RI
amounts to 5 bits RI = 1: 16 states of $i_1$
RI = 2: 16 states of $i_1$ What requires explanation is: in this embodiment, RI is limited to be no more than 2.

Embodiment 14

This embodiment, combining the above embodiment and the preferable implementation methods therein, provides a method for channel information feedback. In the LTE-A system, under the transmission mode that supports closed-loop spatial multiplexing, a UE is required to be configured as a certain feedback model to back channel information. This embodiment realizes the joint encoding of PMI1 and RI in the channel information into a 5-bit Report Type and the feedback of the channel information. This method comprises the following steps.

Step 1: the UE acquires the channel information according to channel estimation first, determines the values of RI, PMI1 and PMI2, and the information of CQI according to the channel information so as to represent the channel information of various current resource granularities, wherein the resource granularities can be broadband, subband, multiple subbands, all the subbands on one carrier when carrier aggregation happens and other resource granularities.

Step 2: the UE uses multiple Report Types to feed back the above channel information at different moments. A Report Type comprising the joint encoding information of the RI and PMI1 is acquired by adopting the joint encoding method of the PMI1 and RI as shown in Table 20, and the Report Type is a piece of 5-bit information.

TABLE 20

Schematic table of the joint encoding of PMI1 and RI
The information of part of RIs and $i_1$ in the codebook
corresponding to the RIs amounts to 4 bits RI = 1: 8 states among 16 states of $i_1$
RI = 2: 8 states among 16 states of $i_1$ What requires explanation is: in this embodiment, RI is limited to be no more than 2.

Figure 3:
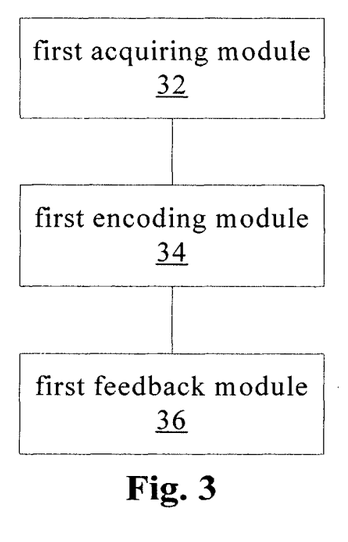
FIG. 3 is a first structure block diagram of a terminal according to an embodiment terminal of the disclosure.

This embodiment provides a terminal. FIG. 3 is the first structure block diagram of the terminal of the embodiment of the disclosure. As shown in FIG. 3, this terminal comprises: a first acquiring module 32, a first encoding module 34 and a first feedback module 36. The structure will be described in detail hereinafter.

The first acquiring module 32 is configured to acquire channel information, wherein the channel information comprises PMI1 information and RI information; the first encoding module 34 is coupled with the first acquiring module 32 and is configured to jointly encode the PMI1 information and RI information acquired by the first acquiring module 32 into a 5-bit Report Type; the first feedback module 36 is coupled with the first encoding module 34 and is configured to feed back the Report Type acquired by the first encoding module 34 on a physical uplink control channel.

Preferably, the 5-bit Report Type acquired by encoding the channel information by the first encoding module 34 is used to indicate one item in an information set formed by combination of the RI information and the PMI1 information, wherein the information set comprises: the information of Mr code word indexes when RI=r, wherein r=1, 2 . . . 8, and $$\sum_{r=1}^{8} Mr <= 32,$$

wherein the information of Mr code word indexes is information of all or part of the indexes in the PMI1 information set in the LTE-A codebook corresponding to RI=r.

Preferably, when RI=r, wherein r=1, 2 . . . 8, the value of Mr is:

M1=8, M2=8, M3=4, M4=4, M5=2, M6=2, M7=1, M8=1; or,

M1=8, M2=8, M3=2, M4=2, M5=4, M6=4, M7=2, M8=1; or,

M1=8, M2=8, M3=4, M4=2, M5=4, M6=4, M7=1, M8=1; or,

M1=8, M2=8, M3=2, M4=4, M5=4, M6=4, M7=1, M8=1; or,

M1=8, M2=8, M3=2, M4=4, M5=4, M6=2, M7=2, M8=1; or,

M1=8, M2=8, M3=4, M4=4, M5=1, M6=1, M7=1, M8=1; or,

M1=8, M2=16, M3=2, M4=2, M5=1, M6=1, M7=1, M8=1; or,

M1=16, M2=8, M3=2, M4=2, M5=1, M6=1, M7=1, M8=1; or,

M1=12, M2=12, M3=2, M4=2, M5=1, M6=1, M7=1, M8=1; or,

M1=8, M2=8, M3=4, M4=4, M5=2, M6=2, M7=0, M8=0; or,

M1=8, M2=8, M3=2, M4=2, M5=4, M6=4, M7=2, M8=0; or,

M1=8, M2=8, M3=4, M4=2, M5=4, M6=4, M7=0, M8=0; or,

M1=8, M2=8, M3=2, M4=4, M5=4, M6=4, M7=0, M8=0; or,

M1=8, M2=8, M3=2, M4=4, M5=4, M6=2, M7=2, M8=0; or,

M1=8, M2=8, M3=4, M4=4, M5=0, M6=0, M7=0, M8=0; or,

M1=8, M2=16, M3=2, M4=2, M5=0, M6=0, M7=0, M8=0; or,

M1=16, M2=8, M3=2, M4=2, M5=0, M6=0, M7=0, M8=0; or,

M1=12, M2=12, M3=2, M4=2, M5=0, M6=0, M7=0, M8=0.

Preferably, the 5-bit Report Type acquired by encoding the channel information by the first encoding module 34 is used to indicate one item in an information set formed by combination of the RI information and the PMI1 information, wherein the information set comprises: the information of Mr code word indexes when RI=r, wherein r=1, 2, 4 and $$\sum_{r=1}^{4} Mr <= 32,$$

wherein the information of Mr code word indexes is information of all or part of the indexes in the PMI1 information set in the LTE-A codebook corresponding to RI=r.

Preferably, when RI=r, wherein r=1, 2 . . . 4, the value of Mr is:

M1=12, M2=12, M3=4, M4=4; or,
M1=8, M2=16, M3=4, M4=4; or,
M1=16, M2=8, M3=4, M4=4, or,
M1=8, M2=8, M3=4, M4=4; or,
M1=8, M2=8, M3=2, M4=2; or,
M1=8, M2=8, M3=2, M4=4; or,
M1=8, M2=8, M3=4, M4=2.

Preferably, the 5-bit Report Type acquired by encoding the channel information by the first encoding module 34 is used to indicate one item in an information set formed by combination of the RI information and the PMI1 information, wherein the information set comprises: the information of Mr code word indexes when RI=r, wherein r=1, 2, and $$\sum_{r=1}^{2} Mr <= 32,$$

wherein the information of Mr code word indexes is information of all or part of the indexes in the PMI1 information set in the LTE-A codebook corresponding to RI=r.

Preferably, when RI=r, wherein r=1, 2, the value of Mr is: M1=16, M2=16.

Figure 4:
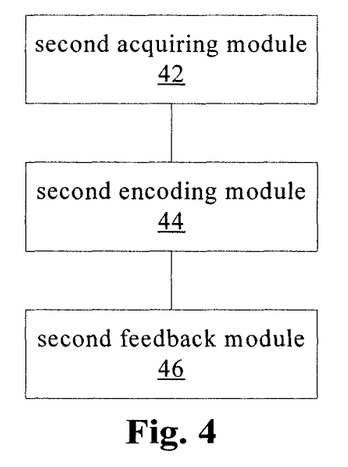
FIG. 4 is a second structure block diagram of a terminal according to an embodiment terminal of the disclosure.

The embodiment provides a terminal. FIG. 4 is the second structure block diagram of the terminal of the embodiment of the disclosure. As shown in FIG. 4, this terminal comprises: a second acquiring module 42, a second encoding module 44 and a second feedback module 46. The structure will be described in detail hereinafter.

The second acquiring module 42 is configured to acquire channel information, wherein the channel information comprises PMI1 information and RI information; the second encoding module 44 is coupled with the second acquiring module 42 and is configured to jointly encode the PMI1 information and RI information acquired by the second acquiring module 42 into a 4-bit Report Type; the second feedback module 46 is coupled with the second encoding module 44 and is configured to feed back the Report Type acquired by the second encoding module 44 on a physical uplink control channel.

Preferably, the 4-bit Report Type acquired by encoding the channel information by the second encoding module 44 is used to indicate one item in an information set formed by combination of the RI information and the PMI1 information, wherein the information set comprises: the information of Mr code word indexes when RI=r, wherein r=1, 2, and $$\sum_{r=1}^{2} Mr <= 16,$$

wherein the information of Mr code word indexes is information of all or part of the indexes in the PMI1 information set in the LTE-A codebook corresponding to RI=r.

Preferably, when RI=r, wherein r=1, 2, the value of Mr is: M1=8, M2=8.

What requires explanation is: the terminal described in the above embodiments correspond to the method embodiments, the specific implementing process thereof is described in details in the method embodiments, so there is no need to repeat it here.

In conclusion, the above embodiments of the disclosure provide methods for channel information feedback and terminals thereof. The PMI and RI information are jointly encoded into a 5 bit or 4 bit Report Type by a terminal and fed back, which solves the problem that the system performance is influenced by high overhead of the channel information feedback in the related arts, thus reducing the overhead of the channel information feedback and improving the efficiency of channel information feedback and the system performance.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A method for channel information feedback, applied to an 8 antennae system, comprising:
a terminal acquiring channel information, wherein the channel information comprises: first type precoding matrix indicator (PMI1) information and rank indicator (RI) information;

the terminal jointly encoding the PMI1 information and the RI information into a 5-bit Report Type or a 4-bit Report Type; and the terminal feeding back the 5-bit Report Type or the 4-bit Report Type on a physical uplink control channel;

wherein if the 5-bit Report Type is used to indicate one item in an information set formed by combination of the RI information and the PMI1 information, the information set comprises:

Mr pieces of code word index information when RI=r, wherein r=1, 2 ... 8, and $$\sum_{r=1}^{8} Mr <= 32,$$

wherein the Mr pieces of code word index information is information of all or part of indexes in a PMI1 information set in a long term evolution (LTE) codebook corresponding to RI=r; or Mr pieces of code word index information when RI=r, wherein r=1, 2 ... 4, and $$\sum_{r=1}^{4} Mr <= 32,$$

wherein the Mr pieces of code word index information is information of all or part of indexes in a PMI1 information set in an LTE codebook corresponding to RI=r; or Mr pieces of code word index information when RI=r, wherein r=1, 2, and $$\sum_{r=1}^{2} Mr <= 32,$$

wherein the Mr pieces of code word index information is information of all or part of indexes in a PMI1 information set in an LTE codebook corresponding to RI=r; or wherein if the 4-bit Report Type is used to indicate one item in an information set formed by combination of the RI information and the PMI1 information, the information set comprises:

Mr pieces of code word index information when RI=r, wherein r=1, 2, and $$\sum_{r=1}^{2} Mr <= 16,$$

wherein the Mr pieces of code word index information is information of all or part of indexes in a PMI1 information set in an LTE codebook corresponding to RI=r.

2. The method according to claim 1, wherein the 5-bit Report Type is used to indicate one item in an information set formed by combination of the RI information and the PMI1 information, wherein the information set comprises:

Mr pieces of code word index information when RI=r, wherein r=1, 2 ... 8, and $$\sum_{r=1}^{8} Mr <= 32,$$

wherein the Mr pieces of code word index information is information of all or part of indexes in a PMI1 information set in a long term evolution (LTE) codebook corresponding to RI=r.

3. The method according to claim 2, wherein when RI=r, wherein r=1, 2 ... 8, the value of Mr is:

M1=8, M2=8, M3=4, M4=4, M5=2, M6=2, M7=1, M8=1; or,
M1=8, M2=8, M3=2, M4=2, M5=4, M6=4, M7=2, M8=1; or,
M1=8, M2=8, M3=4, M4=2, M5=4, M6=4, M7=1, M8=1; or,
M1=8, M2=8, M3=2, M4=4, M5=4, M6=4, M7=1, M8=1; or,
M1=8, M2=8, M3=2, M4=4, M5=4, M6=2, M7=2, M8=1; or,
M1=8, M2=8, M3=4, M4=4, M5=1, M6=1, M7=1, M8=1; or,
M1=8, M2=16, M3=2, M4=2, M5=1, M6=1, M7=1, M8=1; or,
M1=16, M2=8, M3=2, M4=2, M5=1, M6=1, M7=1, M8=1; or,
M1=12, M2=12, M3=2, M4=2, M5=1, M6=1, M7=1, M8=1; or,
M1=8, M2=8, M3=4, M4=4, M5=2, M6=2, M7=0, M8=0; or,
M1=8, M2=8, M3=2, M4=2, M5=4, M6=4, M7=2, M8=0; or,
M1=8, M2=8, M3=4, M4=2, M5=4, M6=4, M7=0, M8=0; or,
M1=8, M2=8, M3=2, M4=4, M5=4, M6=4, M7=0, M8=0; or,
M1=8, M2=8, M3=2, M4=4, M5=4, M6=2, M7=2, M8=0; or,
M1=8, M2=8, M3=4, M4=4, M5=0, M6=0, M7=0, M8=0; or,
M1=8, M2=16, M3=2, M4=2, M5=0, M6=0, M7=0, M8=0; or,
M1=16, M2=8, M3=2, M4=2, M5=0, M6=0, M7=0, M8=0; or,
M1=12, M2=12, M3=2, M4=2, M5=0, M6=0, M7=0, M8=0.

4. The method according to claim 2, wherein when the sum of the Mr is not equal to 32, the other status bits in the 5-bit Report Type are reserved status bits or are used to indicate other information.

5. The method according to claim 1, wherein the 5-bit Report Type is used to indicate one item in an information set formed by combination of the RI information and the PMI1 information, wherein the information set comprises:

Mr pieces of code word index information when RI=r, wherein r=1, 2 ... 4, and $$\sum_{r=1}^{4} Mr <= 32,$$

wherein the Mr pieces of code word index information is information of all or part of indexes in a PMI1 information set in an LTE codebook corresponding to RI=r.

6. The method according to claim 5, wherein when RI=r, wherein r=1, 2 ... 4, the value of Mr is:
M1=12, M2=12, M3=4, M4=4; or,
M1=8, M2=16, M3=4, M4=4; or,
M1=16, M2=8, M3=4, M4=4; or,
M1=8, M2=8, M3=4, M4=4; or,
M1=8, M2=8, M3=2, M4=2; or,
M1=8, M2=8, M3=2, M4=4; or,
M1=8, M2=8, M3=4, M4=2.

7. The method according to claim 6, wherein when the sum of the Mr is not equal to 32, the other status bits in the 5-bit Report Type are reserved status bits or are used to indicate other information.

8. The method according to claim 5, wherein when the sum of the Mr is not equal to 32, the other status bits in the 5-bit Report Type are reserved status bits or are used to indicate other information.

9. The method according to claim 1, wherein the 5-bit Report Type is used to indicate one item in an information set formed by combination of the RI information and the PMI1 information, wherein the information set comprises:
Mr pieces of code word index information when RI=r, wherein r=1, 2, and $$\sum_{r=1}^{2} Mr <= 32,$$

wherein the Mr pieces of code word index information is information of all or part of indexes in a PMI1 information set in an LTE codebook corresponding to RI=r.

10. The method according to claim 9, wherein when RI=r, wherein r=1, 2, the value of Mr is:
M1=16, M2=16.

11. The method according to claim 1, wherein the 4-bit Report Type is used to indicate one item in an information set formed by combination of the RI information and the PMI1 information, wherein the information set comprises:
Mr pieces of code word index information when RI=r, wherein r=1, 2, and $$\sum_{r=1}^{2} Mr <= 16,$$

wherein the Mr pieces of code word index information is information of all or part of indexes in a PMI1 information set in an LTE codebook corresponding to RI=r.

12. The method according to claim 11, wherein when RI=r, wherein r=1, 2, the value of Mr is:
M1=8, M2=8.

13. A terminal, comprising:
a first acquiring module, configured to acquire channel information, wherein the channel information comprises: PMI1 information and RI information;
a first encoding module, configured to jointly code the PMI1 information and the RI information in to a 5-bit Report Type or a 4-bit Report Type; and
a first feedback module, configured to feed back the 5-bit Report Type or the 4-bit Report Type on a physical uplink control channel;
a hardware processor, configured to execute the first acquiring module, the first encoding module, and first feedback module;

wherein if the 5-bit Report Type is used to indicate one item in an information set formed by combination of the RI information and the PMI1 information, the information set comprises:
Mr pieces of code word index information when RI=r, wherein r=1, 2 ... 8, and $$\sum_{r=1}^{8} Mr <= 32,$$

wherein the Mr pieces of code word index information is information of all or part of indexes of a PMI1 information set in an LTE codebook corresponding to RI=r; or
Mr pieces of code word index information when RI=r, wherein r=1, 2 ... 4, and $$\sum_{r=1}^{4} Mr <= 32,$$

wherein the Mr pieces of code word index information is information of all or part of indexes in a PMI1 information set in an LTE codebook corresponding to RI=r; or
Mr pieces of code word index information when RI=r, wherein r=1, 2, and $$\sum_{r=1}^{2} Mr <= 32,$$

wherein the Mr pieces of code word index information is information of all or part of indexes in a PMI1 information set in an LTE codebook corresponding to RI=r; or
wherein if the 4-bit Report Type is used to indicate one item in an information set formed by combination of the RI information and the PMI1 information, the information set comprises:
Mr pieces of code word index information when RI=r, wherein r=1, 2, and $$\sum_{r=1}^{2} Mr <= 16,$$

wherein the Mr pieces of code word index information is information of all or part of indexes in a PMI1 information set in an LTE codebook corresponding to RI=r.

14. The method according to claim 13, wherein the 5-bit Report Type is used to indicate one item in an information set formed by combination of the RI information and the PMI1 information, wherein the information set comprises:
Mr pieces of code word index information when RI=r, wherein r=1, 2 ... 8, and $$\sum_{r=1}^{8} Mr <= 32,$$

wherein the Mr pieces of code word index information is information of all or part of indexes of a PMI1 information set in an LTE codebook corresponding to RI=r.

15. The terminal according to claim 13, wherein the 5-bit Report Type is used to indicate one item in an information set formed by combination of the RI information and the PMI1 information, wherein the information set comprises:

Mr pieces of code word index information when RI=r, wherein r=1, 2 . . . 4, and $$\sum_{r=1}^{4} Mr <= 32,$$

wherein the Mr pieces of code word index information is information of all or part of indexes in a PMI1 information set in an LTE codebook corresponding to RI=r.

16. The terminal according to claim 15, wherein when RI=r, wherein r=1, 2 . . . 4, the value of Mr is:
M1=12, M2=12, M3=4, M4=4; or,
M1=8, M2=16, M3=4, M4=4; or,
M1=16, M2=8, M3=4, M4=4; or,
M1=8, M2=8, M3=4, M4=4; or,
M1=8, M2=8, M3=2, M4=2; or,
M1=8, M2=8, M3=2, M4=4; or,
M1=8, M2=8, M3=4, M4=2.

17. The terminal according to claim 13, wherein the 5-bit Report Type is used to indicate one item in an information set formed by combination of the RI information and the PMI1 information, wherein the information set comprises:

Mr pieces of code word index information when RI=r, wherein r=1, 2, and $$\sum_{r=1}^{2} Mr <= 32,$$

wherein the Mr pieces of code word index information is information of all or part of indexes in a PMI1 information set in an LTE codebook corresponding to RI=r.

18. The terminal according to claim 17, wherein when RI=r, wherein r=1, 2, the value of Mr is:
M1=16, M2=16.

19. The terminal according to claim 13, wherein the 4-bit Report Type is used to indicate one item in an information set formed by combination of the RI information and the PMI1 information, wherein the information set comprises:

Mr pieces of code word index information when RI=r, wherein r=1, 2, and $$\sum_{r=1}^{2} Mr <= 16,$$

wherein the Mr pieces of code word index information is information of all or part of indexes in a PMI1 information set in an LTE codebook corresponding to RI=r.

20. The terminal according to claim 19, wherein when RI=r, wherein r=1, 2, the value of Mr is:
M1=8, M2=8.

* * * * *